United States Patent
Shin et al.

(10) Patent No.: US 12,245,704 B2
(45) Date of Patent: Mar. 11, 2025

(54) ARM REST FOR SEAT

(71) Applicant: HYUNDAI IND. CO., LTD., Ulsan (KR)

(72) Inventors: Kang Mok Shin, Suwon-si (KR); Il Hang Choi, Suwon-si (KR); Dae Hwan Yoon, Suwon-si (KR); Sung Chol An, Hwaseong-si (KR); Min Soo Kim, Ulsan (KR); Min Gyu Lee, Ulsan (KR)

(73) Assignee: HYUNDAI IND. CO., LTD., Ulsan (KR)

( * ) Notice: Subject to any disclaimer, the term of this patent is extended or adjusted under 35 U.S.C. 154(b) by 101 days.

(21) Appl. No.: 18/153,056

(22) Filed: Jan. 11, 2023

(65) Prior Publication Data
US 2024/0225294 A1  Jul. 11, 2024

(51) Int. Cl.
*A47C 7/54*   (2006.01)
*F16H 55/17*  (2006.01)

(52) U.S. Cl.
CPC ............. *A47C 7/541* (2018.08); *F16H 55/17* (2013.01)

(58) Field of Classification Search
CPC ....... F16B 55/17; A47C 1/0308; A47C 7/541; B60N 2/767
See application file for complete search history.

(56) References Cited

U.S. PATENT DOCUMENTS

| | | | | |
|---|---|---|---|---|
| 4,496,190 A * | 1/1985 | Barley | ................... | B60N 2/773 |
| | | | | 297/411.32 |
| 5,984,416 A * | 11/1999 | Waldo | ...................... | A47C 1/03 |
| | | | | 297/411.32 |
| 7,104,609 B2 * | 9/2006 | Kim | ......................... | B60N 2/79 |
| | | | | 297/411.3 |
| 11,731,543 B2 * | 8/2023 | Nuss | ...................... | B60N 2/943 |
| | | | | 297/411.32 |

FOREIGN PATENT DOCUMENTS

| | | | | |
|---|---|---|---|---|
| DE | 4227871 A1 * | 2/1994 | .......... | B60N 2/4633 |
| DE | 19704469 C2 * | 5/2003 | ............. | A47C 7/543 |

* cited by examiner

*Primary Examiner* — Milton Nelson, Jr.
(74) *Attorney, Agent, or Firm* — Finch & Maloney PLLC

(57) ABSTRACT

Disclosed herein is an arm rest for a seat including a connection shaft formed to be fixedly coupled to the seat; a body unit coupled to the connection shaft to rotate about the connection shaft; a fixed unit having a first teeth portion, and fixedly coupled to the connection shaft; a movable unit having a second teeth portion engaged with the first teeth portion, and installed to be rotatable and positionally movable on the body unit; and a stopping unit fixedly installed on the body unit, and engaged with the second teeth portion to stop the rotation of the movable unit at a stop position as the movable unit positionally moves.

15 Claims, 6 Drawing Sheets

ARM REST FOR SEAT

BACKGROUND

Field

The present invention relates to an arm rest mounted on a seat to support a user's arm.

Description of the Related Art

It is a well-known fact that sitting on a chair for a long time is bad for health taking into account a physical structure of a human, which is a vertebrate animal. As the same posture is maintained, a load continuously applied in one direction may cause spinal fixation. This may hinder blood circulation between an upper part and a lower part of the body, break a balance in the body, and deteriorate health.

In a situation where a passenger is in a vehicle for a long time, the occupant needs to be in a sitting posture for a long time. During the operation of the vehicle, repeated up and down vibrations add a dynamic load to a spine of the seated passenger. Accordingly, physical fatigue of the passenger also accumulates.

In order to alleviate the fatigue of the passenger, techniques for distributing the body load concentrated on the spine have also been introduced. For example, by providing an arm rest capable of supporting an arm on a seat, the body load of the passenger can be distributed.

Since the arm rest needs to be tailored to a user's body when used, its inclination angle is adjustable. However, the conventional arm rest adopts a device for arbitrarily adjusting an inclination angle such as a cylinder. This device not only complicates a structure of the arm rest, but also increases a manufacturing cost.

SUMMARY

An object of the present invention is to provide an arm rest for a seat of which an inclination angle can be arbitrarily adjusted without using a complicated and expensive device.

According to an exemplary embodiment of the present invention, there is provided an arm rest for a seat including: a connection shaft formed to be fixedly coupled to the seat; a body unit coupled to the connection shaft to rotate about the connection shaft; a fixed unit having a first teeth portion, and fixedly coupled to the connection shaft; a movable unit having a second teeth portion engaged with the first teeth portion, and installed to be rotatable and positionally movable on the body unit; and a stopping unit fixedly installed on the body unit, and engaged with the second teeth portion to stop the rotation of the movable unit at a stop position as the movable unit positionally moves.

The body unit may include a housing accommodating the fixed unit, the movable unit, and the stopping unit, and the connection shaft may be disposed to penetrate through the housing.

The stopping unit may include a third teeth portion engaged with the second teeth portion at the stop position.

The second teeth portion may include: a 2-1st teeth portion engaged with the first teeth portion; and a 2-2nd teeth portion engaged with the third teeth portion and located at a different height from the 2-1st teeth portion.

The 2-1st teeth portion and the 2-2nd teeth portion may be arranged to have different diameters.

The body unit may include a rail, and the movable unit may include: a plate portion on which the second teeth portion is formed; and a central shaft coupled to the center of the plate portion, and disposed to be movable along an extension direction of the rail.

The extension direction may be a direction approaching toward or away from the stopping unit.

The rail may include a long hole concavely formed in the body unit and into which the central shaft is inserted.

The arm rest may further include an elastic support unit installed on the body unit to elastically support the movable unit toward the stopping unit.

The elastic support unit may include a bent leaf spring.

The arm rest may further include an adjustment unit including a trigger switched between a regulation state, which allows engagement between the second teeth portion and the stopping unit, and a release state, in which the second teeth portion becomes spaced apart from the stopping unit.

In the release state, the central shaft may be spaced apart from an end of the rail close to the stopping unit, while the trigger is in contact with the central shaft.

The trigger may include: a first contact portion contacting the central shaft in the regulation state; and a second contact portion contacting the central shaft in the release state, the trigger may be rotatably installed on at least one of the body unit and the stopping unit, and a distance from the rotation center of the trigger to the first contact portion may be smaller than a distance from the rotation center of the trigger to the second contact portion.

The adjustment unit may further include a switching member fixedly coupled to the connection shaft to rotate the trigger as the body unit rotates relative to the connection shaft.

The switching member may include a first switching protrusion rotating the trigger in a first rotation direction when the body unit rotates in the first rotation direction; and a second switching protrusion rotating the trigger in a second rotation direction when the body unit rotates in the second rotation direction, and the first switching protrusion and the second switching protrusion may be spaced apart from each other in a circumferential direction of the connection shaft.

In the arm rest for the seat configured as described above according to the present invention, a component for adjusting an inclination angle of the arm rest can be implemented by a simple teeth structure, by configuring the movable unit having the second teeth portion engaged with the first teeth portion of the fixed unit so that when the body unit rotates relative to the connection shaft, the movable unit rotates and positionally moves to correspond to the rotation direction of the body unit to allow the rotation of the body unit, or the movable unit is engaged with the stopping unit to stop the rotation of the body unit. Accordingly, an expensive cylinder device or the like is not required for the arm rest, and the configuration of the arm rest can be simplified.

DETAILED DESCRIPTION

Figure 1:
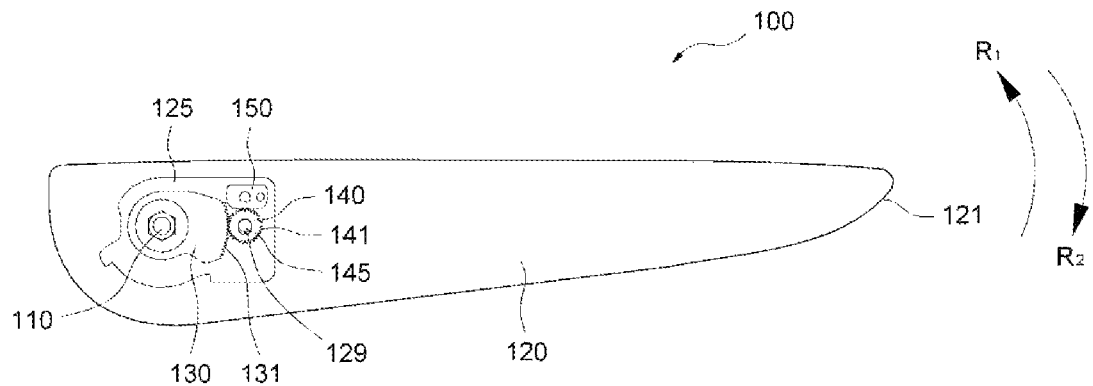
FIG. 1 is a conceptual diagram illustrating an arm rest 100 for a seat according to an exemplary embodiment of the present invention.

Hereinafter, an arm rest for a seat according to a preferred exemplary embodiment of the present invention will be described in detail with reference to the accompanying drawings. Throughout the present specification, the same or similar components will be denoted by the same or similar reference numerals even in different exemplary embodiments. Once the same or similar components are described, the description thereof will not be repeated.

FIG. 1 is a conceptual diagram illustrating an arm rest 100 for a seat according to an exemplary embodiment of the present invention.

Referring to FIG. 1, the arm rest 100 may include a connection shaft 110, a body unit 120, a fixed unit 130, a movable unit 140, and a stopping unit 150.

The connection shaft 110 is a component fixedly coupled to the seat (not shown). The connection shaft 110 may extend along a direction perpendicular to the drawing.

The body unit 120 may include a casing 121 as a part supporting a user's arm. The casing 121 may extend to have a length corresponding to the user's arm. The casing 121 may be generally formed of plastic by injection molding, and may be finished with an outer skin such as leather.

The casing 121 may be coupled to the connection shaft 110. Specifically, the connection shaft 110 may be rotatably inserted into one end portion of the casing 121. The connection shaft 110 is also rotatably coupled to a housing 125 fixedly coupled to the casing 121. The connection shaft 110 may be disposed to penetrate through the housing 125. The housing 125 may be formed of a metal material.

A rail 129 may be formed at the housing 125. The rail 129 is formed along a direction approaching toward or away from the stopping unit 150, specifically along an extension direction E (see FIG. 3). The rail 129 is formed in the housing 125 in a concave structure. Here, the concave structure may include a long hole penetrating through the housing 125.

The fixed unit 130 is a component fixedly coupled to the connection shaft 110. Accordingly, the fixed unit 130 may rotate relative to the body unit 120. A first teeth portion 131 is formed on an outer peripheral surface of a body of the fixed unit 130. The first teeth portion 131 may be formed on the entire outer peripheral surface of the body of the fixed unit 130, but it is exemplified in the present exemplary embodiment that the first teeth portion 131 is formed only on a partial section of the outer peripheral surface of the body of the fixed unit 130.

The movable unit 140 is a component installed in the body unit 120 to be rotatable and positionally movable. The movable unit 140 is disposed to be engaged with the first teeth portion 131 while being spaced apart from the connection shaft 110. Specifically, the movable unit 140 has a second teeth portion 141 engaged with the first teeth portion 131.

The second teeth portion 141 may be formed on an outer circumferential surface of a plate portion 143 of the movable unit 140. The plate portion 143 may have a disk shape. The second teeth portion 141 may be formed on the entire section of the outer circumferential surface of the plate portion 143.

A central shaft 145 may protrude from the center of the plate portion 143. The central shaft 145 may protrude on both sides of the plate portion 143. The central shaft 145 may be arranged parallel to the connection shaft 110. The central shaft 145 may be inserted into the rail 129 to be positionally movable along the extension direction E of the rail 129.

The stopping unit 150 is a component for stopping the rotation of the movable unit 140 at a stop position. The stopping unit 150 is located above the movable unit 140 moving along the rail 129. The stopping unit 150 may have a component by which the second teeth portion 141 of the movable unit 140 is stopped at the stop position. As such a component, a third teeth portion 151 to be engaged with the second teeth portion 141 may be employed. The third teeth portion 151 may be formed of several teeth on a bottom surface of a body of the stopping unit 150.

Figure 2:
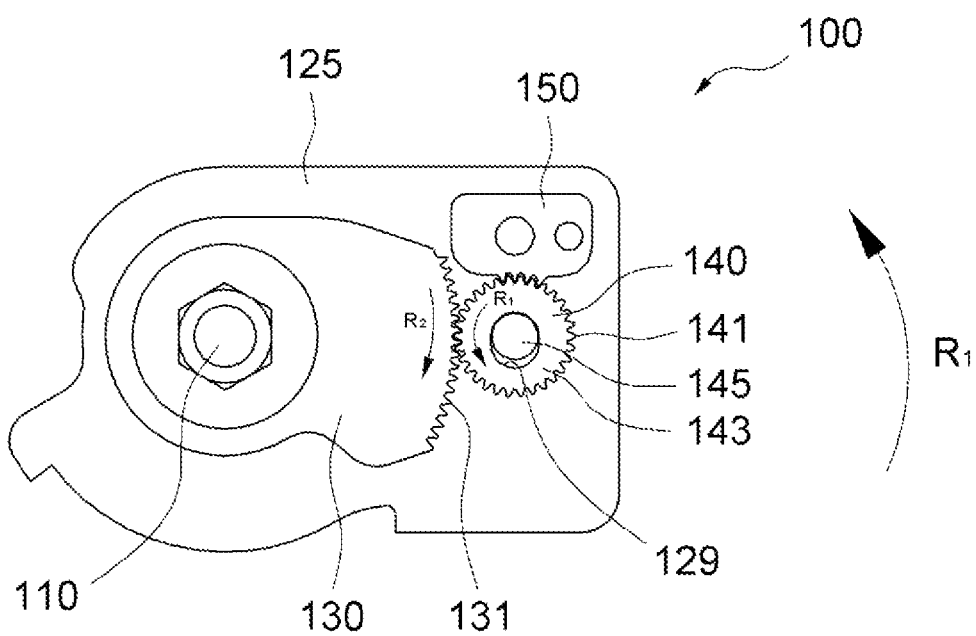
FIGS. 2 and 3 are conceptual diagrams of main components illustrating sequential states of the arm rest 100 when a housing 125 of FIG. 1 rotates along a first rotation direction $R_1$.
Figure 3:
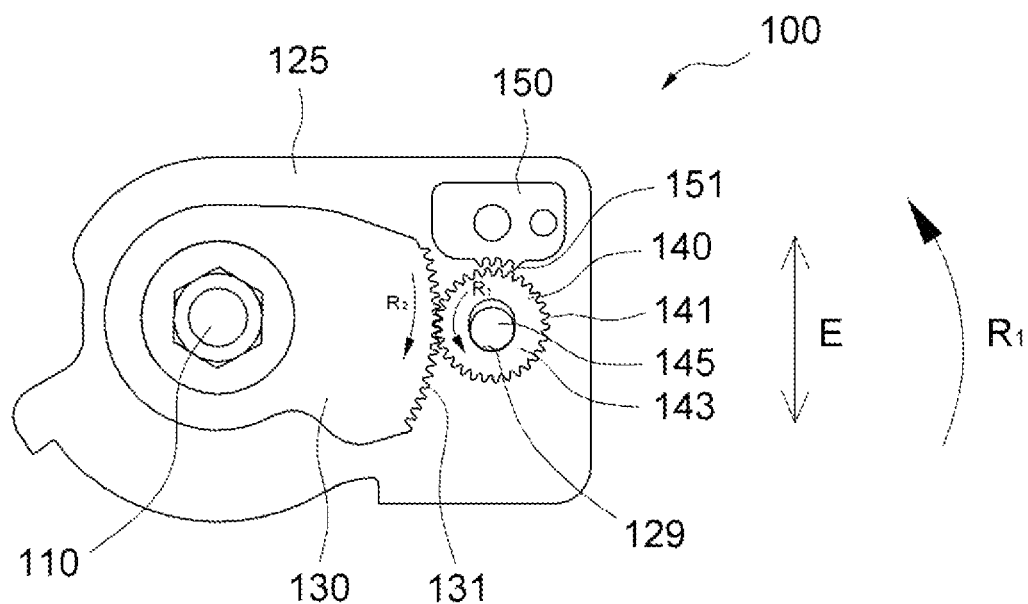

Rotating and stopping operations of the body unit 120 based on the above-described configuration will be described with reference to FIGS. 2 and 3. FIGS. 2 and 3 are conceptual diagrams of main components illustrating sequential states of the arm rest 100 when the housing 125 of FIG. 1 rotates along a first rotation direction $R_1$.

First, referring to FIG. 2, the user may lift the body unit 120 along the first rotation direction $R_1$ from the state of FIG. 1.

In this case, although the first teeth portion 131 is fixed to the connection shaft 110, the first teeth portion 131 is deemed to rotate in a second rotation direction $R_2$ relative to the body unit 120. Accordingly, the second teeth portion 141 engaged with the first teeth portion 131 rotates in the first rotation direction $R_1$.

As the second teeth portion 141 rotates, the movable unit 140 rotates and positionally moves along a direction away from the stopping unit 150. Specifically, the central shaft 145 positionally moves along the rail 129. Accordingly, the second teeth portion 141 starts to be spaced apart from the third teeth portion 151 of the stopping unit 150. Next, referring to FIG. 3, as the body unit 120 is additionally lifted in the first rotation direction $R_1$, the movable unit 140 continues to rotate and positionally move. As a result, the second teeth portion 141 of the movable unit 140 becomes surely spaced apart from the third teeth portion 151 of the stopping unit 150.

Since the second teeth portion 141 and the third teeth portion 151 are not engaged with each other, the body unit 120 is free to additionally rotate along the first rotation direction $R_1$. The body unit 120 may rotate up to 360° along the first rotation direction $R_1$.

When the user determines that the body unit 120 is properly lifted and tries to fix the body unit 120 at that position, the user only needs to slightly rotate the body unit 120 in the second rotation direction $R_2$. This results in the state of FIG. 1 through the state of FIG. 2 from the state of FIG. 3.

Specifically, it can be understood that when the body unit 120 rotates in the second rotation direction $R_2$, the first teeth portion 131 rotates along the first rotation direction $R_1$ relative to the body unit 120. In this case, the second teeth portion 141 rotates along the second rotation direction $R_2$ and positionally moves toward the stopping unit 150. When the second teeth portion 141 is engaged with the third teeth portion 151, the rotation and the positional movement of the movable unit 140 are limited as illustrated in FIG. 1.

Since the movable unit 140 is not allowed to rotate, the body unit 120 becomes fixed at a set position. As a result, even though the user presses the body unit 120 downward while placing an arm on the body unit 120, the body unit 120 can be kept in the fixed state without rotating along the second rotation direction $R_2$.

Now, another type of arm rest 100' will be described with reference to FIGS. 4 to 10.

Figure 4:
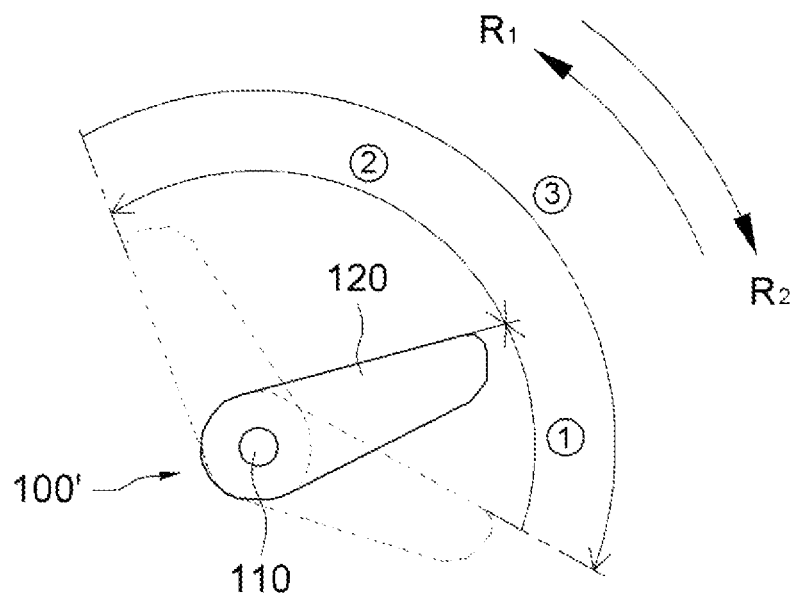
FIG. 4 is a conceptual diagram for explaining how an arm rest 100' is operated according to another exemplary embodiment of the present invention.

FIG. 4 is a conceptual diagram for explaining how an arm rest 100' is operated according to another exemplary embodiment of the present invention.

Referring to FIG. 4, the arm rest 100' may be formed to have a regulation section 1 and release sections 2 and 3.

In the regulation section 1, the movable unit 140 acts with the fixed unit 130 to allow the body unit 120 to rotate along the first rotation direction $R_1$ away from the stopping unit 150, as in the arm rest 100 according to the previous exemplary embodiment. Conversely, as the movable unit 140 is engaged with the fixed unit 130, the body unit 120 is not allowed to rotate along the second rotation direction $R_2$.

On the other hand, in the release sections 2 and 3, since the movable unit 140 is not structurally engaged with the stopping unit 150, the body unit 120 is allowed to rotate not only in the first rotation direction $R_1$ but also in the second rotation direction $R_2$.

Accordingly, the user may set an inclination angle of the body unit 120 to a desired level within the regulation section 1. When the inclination angle of the body unit 120 is higher than necessary, the user may cause the body unit 120 to sequentially pass through the release section 2 and another release section 3. Accordingly, the body unit 120 may be located at a lower end of the regulation section 1 again. The user may newly adjust an inclination angle of the body unit 120 within the regulation section 1.

Figure 5:
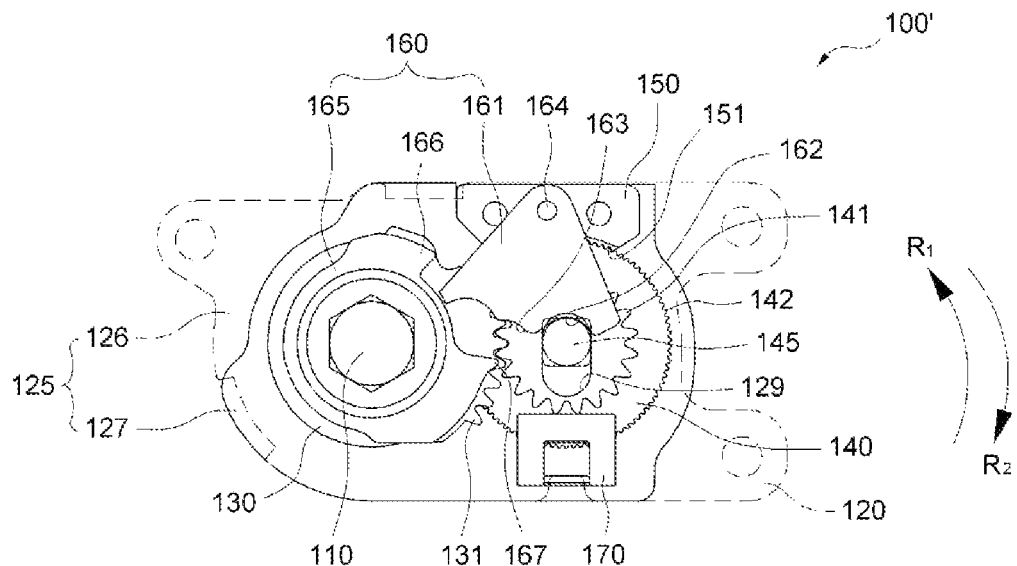
FIG. 5 is a conceptual diagram illustrating a specific configuration of the arm rest 100' of FIG. 4.

The arm rest 100' for this operation is illustrated in FIG. 5. FIG. 5 is a conceptual diagram illustrating a specific configuration of the arm rest 100' of FIG. 4. The substantially same components as in the arm rest 100 according to the previous exemplary embodiment will be denoted by the same reference numerals, and the detailed description thereof will not be repeated.

Referring to FIG. 5, the arm rest 100' includes a connection shaft 110, a body unit 120, a fixed unit 130, a movable unit 140, and a stopping unit 150, as in the previous exemplary embodiment. These will be mainly explained based on differences from those in the previous exemplary embodiment.

The housing 125 of the body unit 120 has a front part 126 and a rear part 127. The front part 126 and the rear part 127 form an internal space. The fixed unit 130, the movable unit 140, and the stopping unit 150 may be accommodated in the internal space. Unlike the fixed unit 130, the movable unit 140, and the stopping unit 150, the connection shaft 110 may be disposed to penetrate through the housing 125.

The second teeth portion of the movable unit 140 may include a primary teeth portion 141 and a secondary teeth portion 142. The primary teeth portion 141 is engaged with the first teeth portion 131, while the secondary teeth portion 142 is engaged with the third teeth portion 151. The primary teeth portion 141 and the secondary teeth portion 142 are stacked on each other and located at different heights. Also, the primary teeth portion 141 and the secondary teeth portion 142 may be formed to have different diameters. Specifically, a plate portion on which the primary teeth portion 141 is formed may be a disc having a small diameter, and a plate portion on which the secondary teeth portion 142 is formed may be a disc having a large diameter.

In addition to the above-described components, the arm rest 100' may further include an adjustment unit 160 and an elastic support unit 170.

The adjustment unit 160 is a component enabling switching between a regulation state that allows engagement between the second teeth portion (specifically, the secondary teeth portion 142) and the third teeth portion 151, and a release state that does not allow the engagement. Accordingly, the regulation state corresponds to the regulation section 1 described above, and the release state corresponds to the release sections 2 and 3 described above (see FIG. 4).

Specifically, the adjustment unit 160 may include a trigger 161 and a switching member 165.

The trigger 161 is in contact with the central shaft 145 to push the central shaft 145 (and the secondary teeth portion 142) to a position spaced apart from the third teeth portion 151, or to allow engagement between the secondary teeth portion 142 and the third teeth portion 151. In order to push the central shaft 145 (and the secondary teeth portion 142) to a position spaced apart from the third teeth portion 151, which corresponds to the release state, the central shaft 145 is spaced apart from an end of the rail 129 close to the stopping unit 150. In order to allow engagement between the secondary teeth portion 142 and the third teeth portion 151, which correspond to the regulation state, the central shaft 145 is allowed to contact the end of the rail 129 close to the stopping unit 150.

The trigger 161 may be rotatably coupled to the body unit 120 or the body of the stopping unit 150. It is illustrated that the trigger 161 has a generally triangular shape, but the trigger 161 may be formed to have another shape. A first contact portion 162 and a second contact portion 163 may be formed on a bottom surface of the trigger 161. Both the first contact portion 162 and the second contact portion 163 may have a curved surface shape to accommodate a circumferential surface of the central shaft 145.

The first contact portion 162 is in contact with the central shaft 145 in the regulation state. On the other hand, the second contact portion 163 is in contact with the central shaft 145 in the release state. To this end, positions of the first contact portion 162 and the second contact portion 163 are different from each other. Specifically, a distance from the rotation center 164 of a body of the trigger 161 to the first contact portion 162 is shorter than a distance from the rotation center 164 of a body of the trigger 161 to the second contact portion 163.

The switching member 165 is a component for switching the trigger 161 between the regulation state and the release state by rotating the trigger 161. The switching member 165 is fixedly coupled to the connection shaft 110 to push and rotate the trigger 161 at the time of rotating the body unit 120 relative to the connection shaft 110.

The switching member 165 may have a first switching protrusion 166 and a second switching protrusion 167 in contact with the trigger 161. The first switching protrusion 166 rotates the trigger 161 in the first rotation direction $R_1$ when the body unit 120 rotates in the first rotation direction $R_1$. In contrast, the second switching protrusion 167 rotates the trigger 161 in the second rotation direction $R_2$ when the body unit 120 rotates in the second rotation direction $R_2$. The first switching protrusion 166 and the second switching protrusion 167 are spaced apart from each other in a circumferential direction of the connection shaft 110.

The elastic support unit 170 is a component elastically supporting the movable unit 140 toward the stopping unit 150. The elastic support unit 170 may be a spring, specifically a bent leaf spring. The elastic support unit 170 is installed on the body unit 120 to support the movable unit 140.

Figure 6:
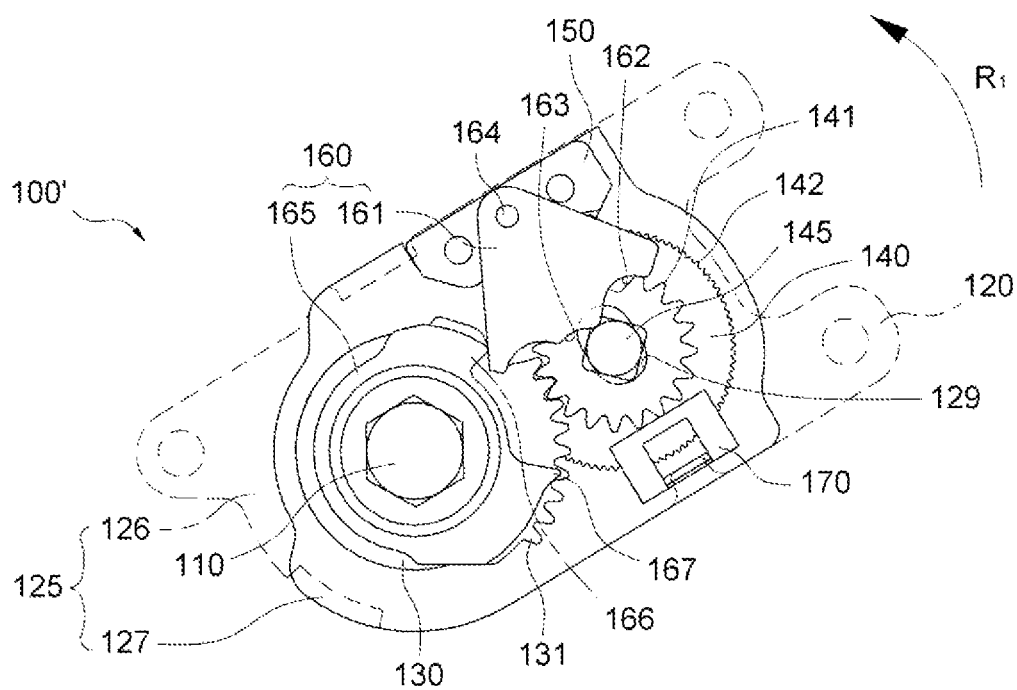
FIGS. 6 to 8 are conceptual diagrams of main components illustrating sequential states of the arm rest 100' when the arm rest 100' rotates along the first rotation direction $R_1$.
Figure 7:
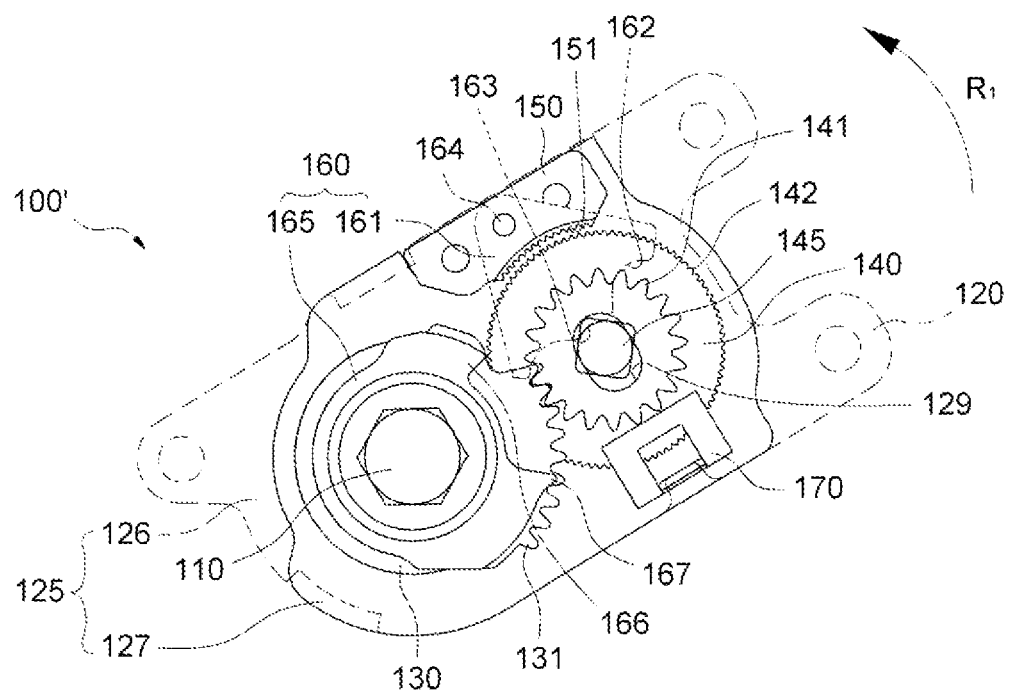
Figure 8:
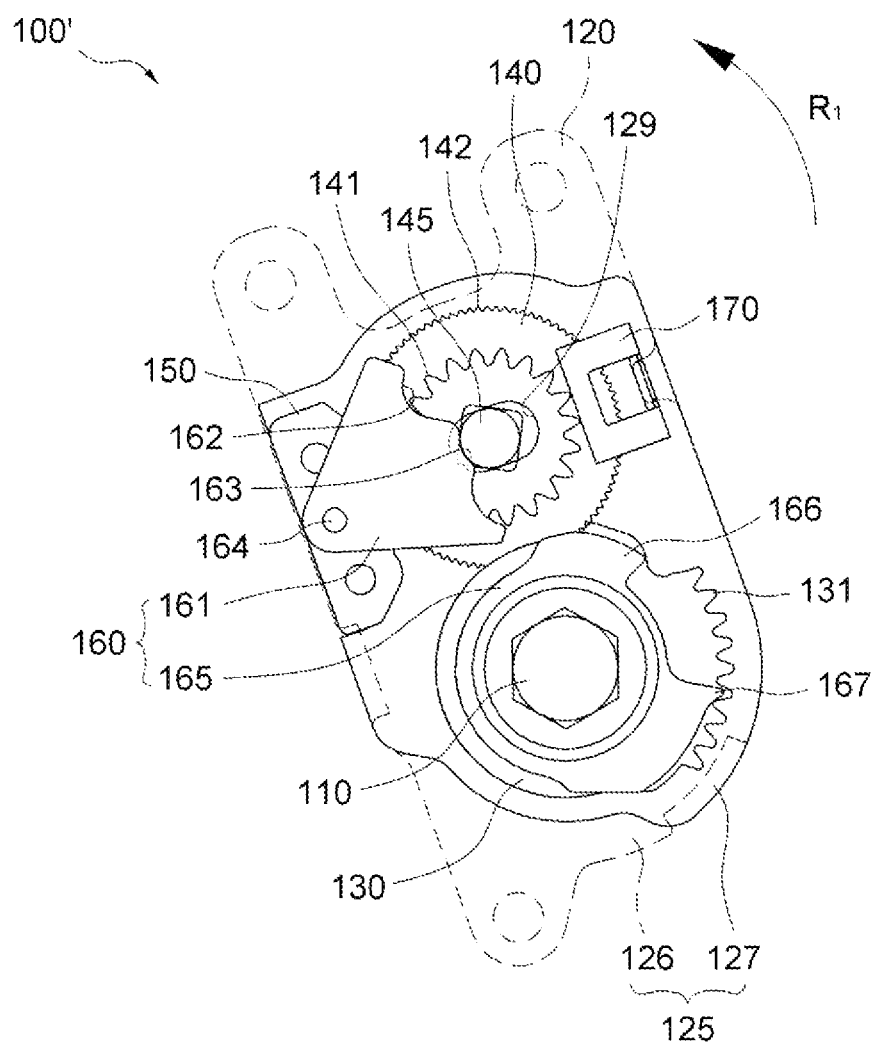

A process in which the body unit 120 proceeds to the release section 2 through the regulation section 1 will be described with reference to FIGS. 6 to 8. FIGS. 6 to 8 are conceptual diagrams of main components illustrating sequential states of the arm rest 100' when the arm rest 100' rotates along the first rotation direction $R_1$.

Referring to FIGS. 5 to 7, as the user rotates the body unit 120 in the first rotation direction $R_1$, the first contact portion 162 of the trigger 161 contacts the central shaft 145, and then the second contact portion 163 comes into contact with the central shaft 145. This is because the first switching protrusion 166 of the switching member 165 pushes the body of the trigger 161, such that the trigger 161 rotates along the first rotation direction $R_1$. FIGS. 5 to 7 correspond to the regulation section 1, in which an inclination angle of the body unit 120 may be adjusted as described with reference to FIGS. 1 to 3 above.

Next, referring to FIGS. 7 and 8, the body unit 120 rotates within the release section 2. At this time, the central shaft 145 is spaced apart from the upper end of the rail 129 while being in contact with the second contact portion 163. In this state, the 2-2nd teeth portion 142 of the movable unit 140 is not structurally able to be engaged with the third teeth portion 151.

Figure 9:
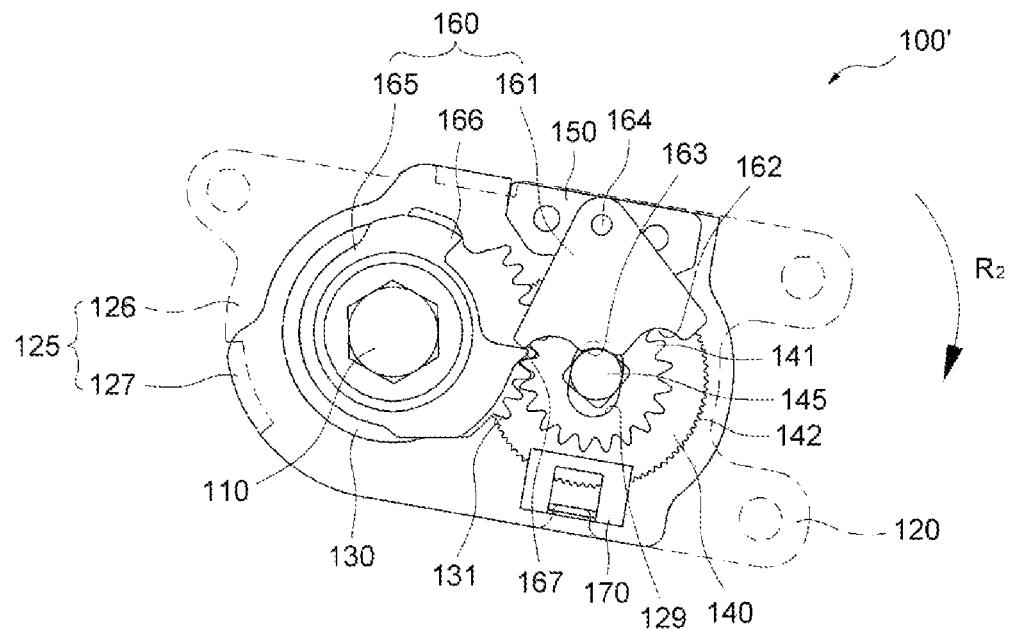
FIGS. 9 and 10 are conceptual views of main components illustrating sequential states of the arm rest 100' when the arm rest 100' rotates along a second rotation direction $R_2$.
Figure 10:
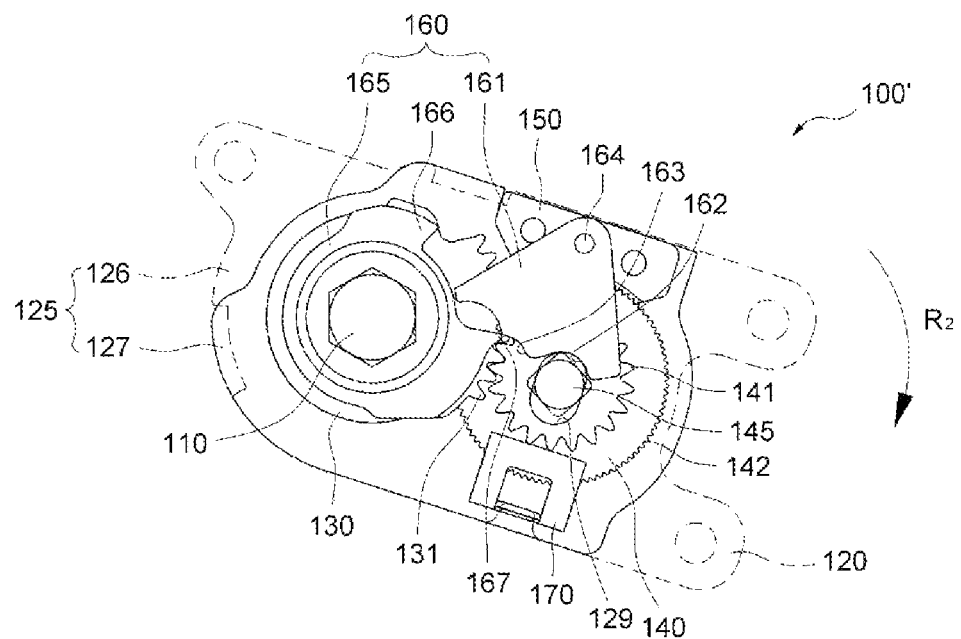

FIGS. 9 and 10 are conceptual views of main components illustrating sequential states of the arm rest 100' when the arm rest 100' rotates along the second rotation direction $R_2$.

Referring to FIGS. 8 to 10, the body unit 120 rotates along the second rotation direction $R_2$, and the switching member 165 rotates along the first rotation direction $R_1$ relative to the body unit 120.

During the rotation of the switching member 165, the second switching protrusion 167 rotates the body of the trigger 161 along the second rotation direction $R_2$. Accordingly, the first contact portion 162 of the trigger 161 comes into contact with the central shaft 145 again. Then, the 2-2nd teeth portion 142 is allowed to be engaged with the third teeth portion 151.

This operation occurs within the release section 3 to restart the operation in the regulation section 1.

The arm rests for seats as described above are not limited to the configurations and operation methods according to the above-described exemplary embodiments. Various modifications can be made by combining the above-described exemplary embodiments together either partially or entirely in a selective manner.

What is claimed is:

1. An arm rest for a seat, the arm rest comprising:
a connection shaft formed to be fixedly coupled to the seat;
a body unit coupled to the connection shaft to rotate about the connection shaft;
a fixed unit having a first teeth portion, and fixedly coupled to the connection shaft;
a movable unit having a second teeth portion engaged with the first teeth portion, and installed to be rotatable and positionally movable on the body unit; and
a stopping unit fixedly installed on the body unit, and engaged with the second teeth portion to stop the rotation of the movable unit at a stop position as the movable unit positionally moves.

2. The arm rest of claim 1, wherein the body unit includes a housing accommodating the fixed unit, the movable unit, and the stopping unit, and the connection shaft is disposed to penetrate through the housing.

3. The arm rest of claim 1, wherein the stopping unit includes a third teeth portion engaged with the second teeth portion at the stop position.

4. The arm rest of claim 3, wherein the second teeth portion includes:
a primary teeth portion engaged with the first teeth portion; and
a secondary teeth portion engaged with the third teeth portion and located at a different height from the primary teeth portion.

5. The arm rest of claim 4, wherein the primary teeth portion and the secondary teeth portion are arranged to have different diameters.

6. The arm rest of claim 1, wherein the body unit includes a rail, and
the movable unit includes:
a plate portion on which the second teeth portion is formed; and
a central shaft coupled to the center of the plate portion, and disposed to be movable along an extension direction of the rail.

7. The arm rest of claim 6, wherein the extension direction is a direction approaching toward or away from the stopping unit.

8. The arm rest of claim 6, wherein the rail includes a long hole concavely formed in the body unit and into which the central shaft is inserted.

9. The arm rest of claim 1, further comprising an elastic support unit installed on the body unit to elastically support the movable unit toward the stopping unit.

10. The arm rest of claim 9, wherein the elastic support unit includes a bent leaf spring.

11. The arm rest of claim 6, further comprising an adjustment unit including a trigger switched between a regulation state, which allows engagement between the second teeth portion and the stopping unit, and a release state, in which the second teeth portion becomes spaced apart from the stopping unit.

12. The arm rest of claim 11, wherein in the release state, the central shaft is spaced apart from an end of the rail close to the stopping unit, while the trigger is in contact with the central shaft.

13. The arm rest of claim 12, wherein the trigger includes:
a first contact portion contacting the central shaft in the regulation state; and
a second contact portion contacting the central shaft in the release state,
the trigger is rotatably installed on at least one of the body unit and the stopping unit, and
a distance from the rotation center of the trigger to the first contact portion is smaller than a distance from the rotation center of the trigger to the second contact portion.

14. The arm rest of claim 13, wherein the adjustment unit further includes a switching member fixedly coupled to the connection shaft to rotate the trigger as the body unit rotates relative to the connection shaft.

15. The arm rest of claim 14, wherein the switching member includes:
a first switching protrusion rotating the trigger in a first rotation direction when the body unit rotates in the first rotation direction; and
a second switching protrusion rotating the trigger in a second rotation direction when the body unit rotates in the second rotation direction, and the first switching protrusion and the second switching protrusion are spaced apart from each other in a circumferential direction of the connection shaft.

* * * * *